United States Patent [19]

Wustefeld

[11] Patent Number: 4,998,690
[45] Date of Patent: Mar. 12, 1991

[54] SRB AND EXTERNAL TANK STABILIZING SYSTEM

[76] Inventor: Walter Wustefeld, 15 Kersey Crescent, Richmond Hill, Ontario, Canada, L4C 3W2

[21] Appl. No.: 145,919

[22] Filed: Jan. 20, 1988

[51] Int. Cl.⁵ .......................... B64G 1/40; B64G 1/14; B64G 1/22; B64G 1/00
[52] U.S. Cl. .................................. 244/158 R; 244/172
[58] Field of Search ..................... 244/54, 158 R, 172, 244/160, 162, 63

[56] References Cited

U.S. PATENT DOCUMENTS

| | | | |
|---|---|---|---|
| 4,452,412 | 6/1984 | von Pragenau | 244/158 R X |
| 4,807,833 | 2/1989 | Pori | 244/158 R |
| 4,848,806 | 7/1989 | Miller | 244/172 X |

Primary Examiner—Joseph F. Peters, Jr.
Assistant Examiner—James M. Kannofsky

[57] ABSTRACT

The present invention provides an improvement in a launch pad mounting system of solid rocket boosters and external tank for a space shuttle craft. The improvement comprises a launch tower support for the inside solid rocket booster and a slideable rocket booster support which allows cryogenic shrinkage of the external tank without affecting preset uptight positioning of the outside solid rocket booster.

10 Claims, 4 Drawing Sheets

SRB AND EXTERNAL TANK STABILIZING SYSTEM

FIELD OF THE INVENTION

This invention relates to a mounting system for a space shuttle external tank and solid rocket booster combination.

BACKGROUND OF THE INVENTION

The launch power for a space shuttle craft is in the form of a pair of solid rocket boosters mounted to either side of an external tank on which the shuttle craft is supported. This arrangement along with the launch pad is transported to the launch tower where one of the solid rocket boosters, referred to as the inside booster, is located adjacent the launch tower. The other solid rocket booster referred to as the outside booster is positioned outwardly away from the tower. Both boosters are attached to the external tank and both are upright mounted at their bases directly to the launch pad.

After the system has been set-up on the launch pad and moved to the launch tower as described above, the external tank is filled with liquid oxygen in the top part of the tank and liquid hydrogen in the bottom part of the tank. These two fuels have extremely low temperatures resulting in substantial cryogenic shrinkage of the external tank. Since the inside rocket booster is supported from the tower and the outside booster is vertically unsupported other than at its base, the shrinkage results in an inward pulling on the outside booster. This can adversely affect the optimum upright positioning of the outside solid rocket booster such that it is misaligned with the inside booster.

SUMMARY OF THE PRESENT INVENTION

The present invention provides an improvement in a launch pad mounting system of an outside solid rocket booster for a space shuttle craft. The improvement of the present invention comprises a launch tower support for the inside solid rocket booster and slideable support means for the outside solid rocket booster to at least substantially maintain the preset upright positioning of both solid rocket boosters when the external tank experiences cryogenic shrinkage during filling of the tank.

According to an aspect of the present invention, the slideable rocket booster support means comprises a slideable base support for mounting the outside solid rocket booster to the launch pad and which enables the entire outside booster to slide inwardly during cryogenic shrinkage of the external tank.

According to a further aspect of the present invention, the slideable rocket booster support comprises a piston type support strut between the external tank and the outside solid rocket booster which allows the external tank to move relative to the outside solid rocket booster during the cryogenic shrinkage.

BRIEF DISCUSSION OF THE DRAWINGS

The above as well as other advantages and features of the present invention will be described in greater detail according to the preferred embodiments of the present invention in which.

DETAILED DESCRIPTION ACCORDING TO THE PREFERRED EMBODIMENTS OF THE PRESENT INVENTION

Figure 1:
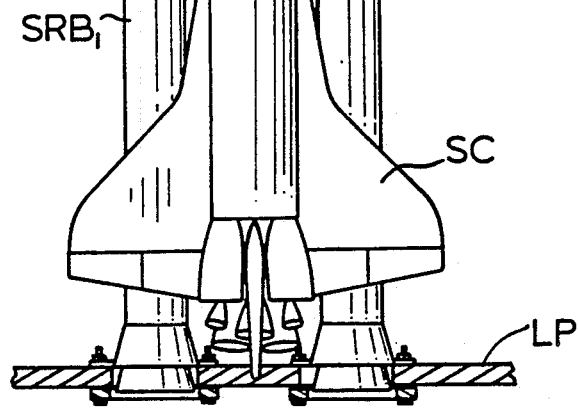
FIG. 1 is a front plan view of a space shuttle craft with associated solid rocket boosters and external tank with the outside solid rocket booster being mounted to the launch pad by a slideable rocket booster support in accordance with a preferred embodiment of the present invention.

FIG. 1 shows a shuttle craft SC to be powered by an external tank ET and a pair of solid rocket boosters SRB1 and SRB2. SRB1 is referred to as the inside booster because of its positioning relative to a launch tower from which SRB1 is supported.

Both of the SRB's are supported from below by means of a launch pad LP. The external tank ET does not come down as far as the launch pad and is supported completely by the two SRB's.

The shuttle craft with its ET and SRB fuel supplies in accordance with conventional practice is initially set-up supported on its launch pad and then moved along with the launch pad to a conventional launch tower. The external tank is fueled after final set-up and shortly before launch. The actual fueling for the external tank is in the form of liquid oxygen at minus 297° F. occupying the upper part of the tank and liquid hydrogen occupying the lower part of the tank at minus 423° F. The percentage volumn of hydrogen to oxygen is about 3:1 with both being kept at extremely low temperatures and in particular the hydrogen at a temperature approaching absolute zero. The filling of the external tank with the oxygen and hydrogen at these extremely low temperatures results in shrinkage of the tank through a natural cryogenic reaction of the molecules of the tank structure.

In a standard mounting system there is no compensating for this cryogenic shrinkage which occurs dynamically in all directions through the system. Accordingly, there is a pressure buildup particularly at each of the SRB's which are secured to the launch pad by means of releasible or break away bolts. However, there is very little likelihood of all of the bolts releasing at the same time during launch where imbalancing pressures at one SRB or the other then take over to force the shuttle craft off line causing potentially disasterous results.

The present invention specifically includes means to compensate for these imbalancing forces in the system as described above.

More particularly, the inside SRB, SRB1, is in accordance with the present invention supported from the launch tower from above by means of a support member 2. This support member in combination with the base support for SRB1 directly at the launch pad maintain it in its proper upright positioning.

The cryogenic shrinkage sets up pressures occurring dynamically in all directions through the system. Again in accordance with standard practice there is no compensating support for the outside SRB2. The present invention, one embodiment of which is well shown in FIGS. 2 through 4 of the drawings, specifically includes a sliding base mount for SRB2 to compensate for imbalancing pressures.

Figure 2:
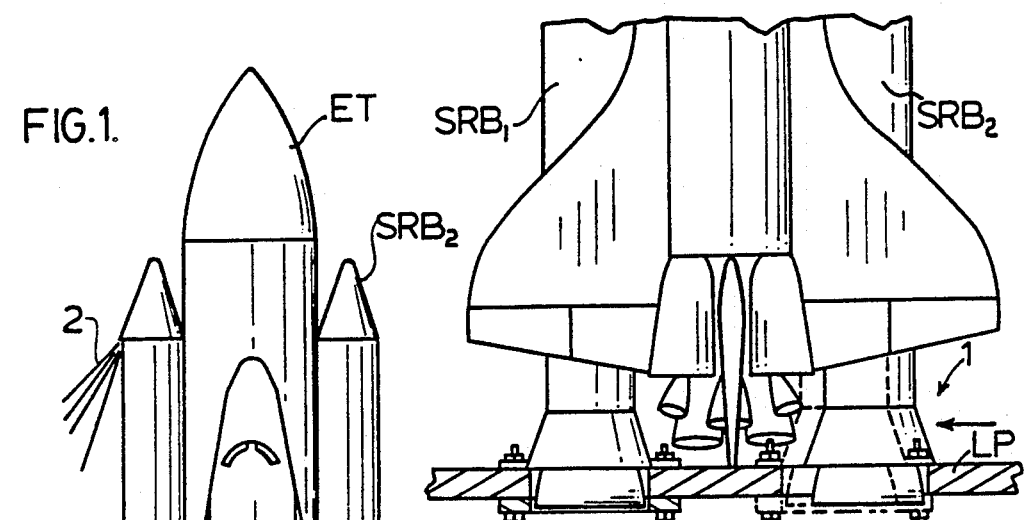
FIG. 2 is an enlarged view of the bottom mounting of the arrangement of FIG. 1 to the launch pad.
Figure 4:
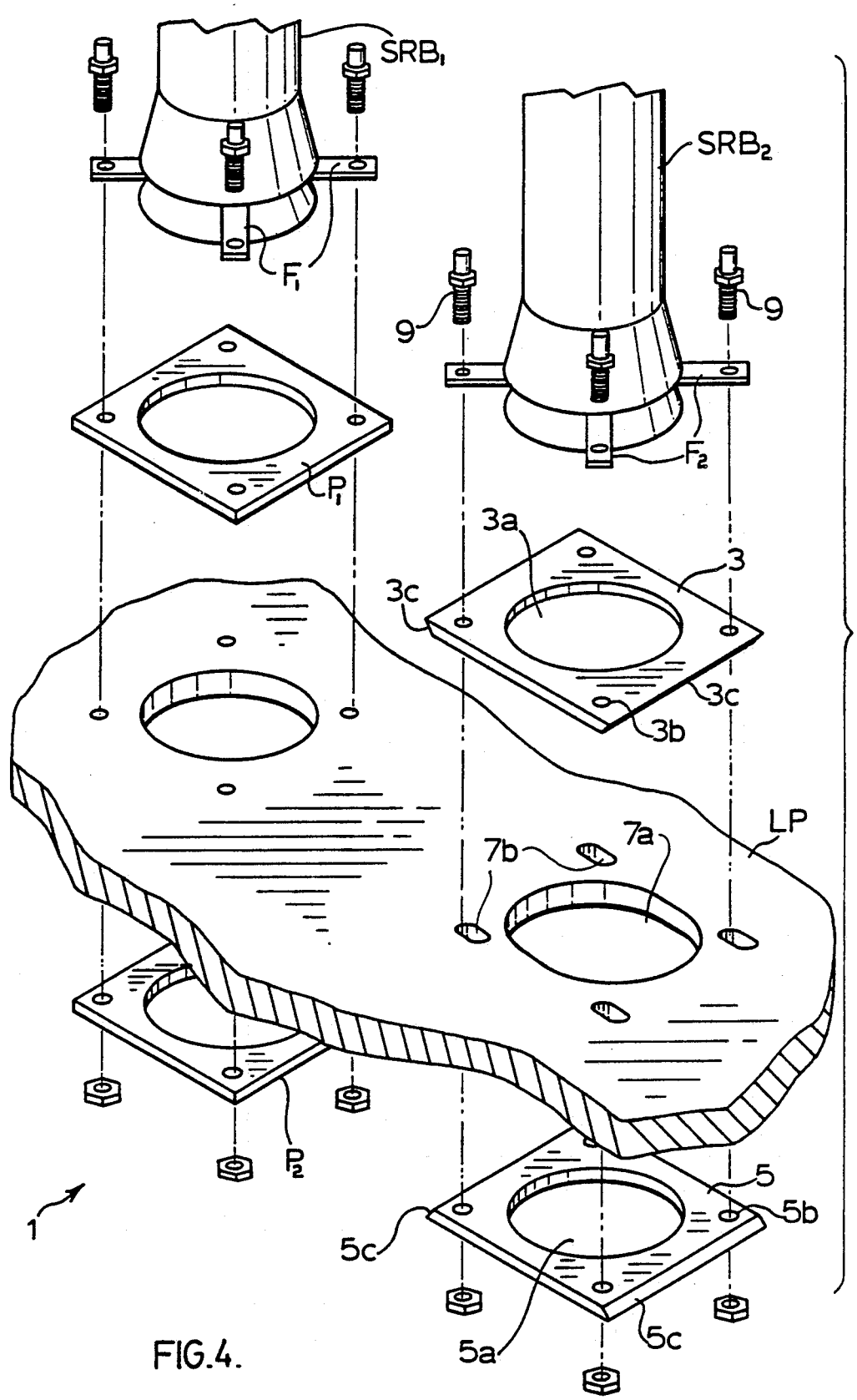
FIG. 4 is an exploded perspective view of the mounting system of the two solid rocket boosters of FIGS. 1 and 2 to the launch pad.

This sliding base mount is generally indicated at 1 in FIGS. 2 and 4 of the drawings. It comprises a pair of plates 3 and 5 fitted above and below the launch pad LP. The plates are provided with main central openings 3a and 5a as well as outer peripheral openings 3b and 5b respectively. Note that the edge regions 3c and 5c on the two plates are bevelled as shown in FIG. 4.

The launch pad itself is provided with a main opening 7a and a plurality of peripheral openings 7b. Each of these openings are elongated in a direction towards SRB1 which is also mounted to the launch pad to be described later in greater detail.

SRB2 includes a plurality of outwardly extending flanges F2 with the bottom end of SRB2 extending downwardly beyond these flanges. When the SRB is secured to the launch pad its bottom end is fitted through opening 3a in plate 3, continues downwardly through opening 7a in the launch pad and finally into opening 5a on the lower plate 5. Explosive bolts 9 are used to tighten SRB2 in its mounted position by fitting down through the openings in flanges F2 continuing through openings 3b in plate 3, openings 7b in the launch pad and finally openings 5b in plate 5 where the bolt ends are exposed for receiving tightening nuts as shown in FIG. 4.

The base support mounting for SRB2 is to be compared with that of SRB1 which is fitted downwardly through a pair of plates P1 and P2 on either side of the launch pad and held in position by means of bolts fitted through flanges F1 on SRB1. The prime difference between the two mountings is that the hole through the launch pad to accomodate the through fitting of the bottom end of SRB1 is substantially circular and prevents any side to side movement of the bottom end of SRB1.

Figures 3A, 3B:
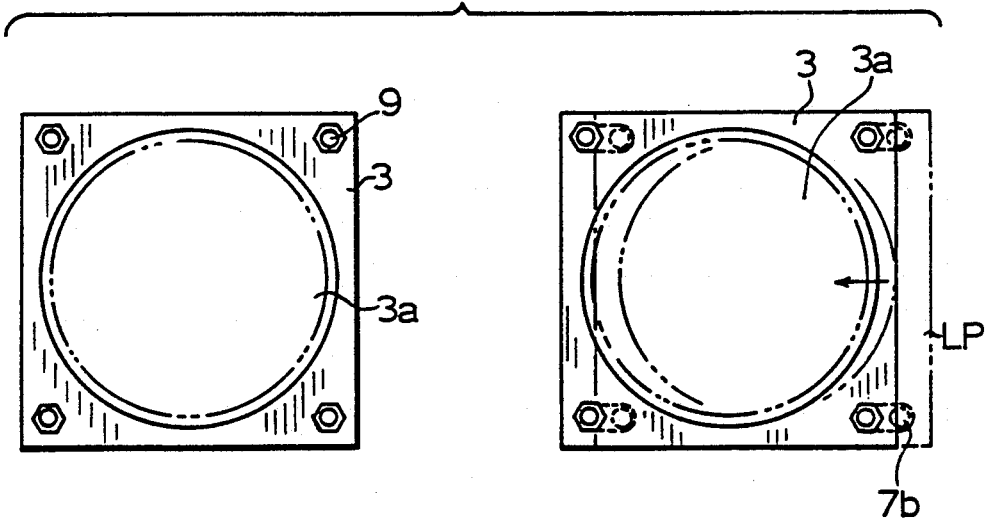
FIGS. 3a and 3b are top plan views of the slide plate mounting system of FIGS. 1 and 2 for the outside solid rocket booster.

In contrast, the bottom end of SRB2 is allowed to slide from side to side. During initial set-up prior to filling the external tank the two plates 3 and 5 are mounted to an outwardly located position relative to the support tower as shown in FIG. 3a of the drawings. As the external tank is fueled it experiences cryogenic shrinkage and because the inside SRB1 is fully supported in its upright position, this shrinkage results in an inward pulling on SRB2. SRB2, rather than attempting to fight these forces, is allowed to slide inwardly at its bottom end to the FIG. 3b position where there is relative movement between the two mounting plates and the launching pad. It is the elongated shaping of the openings in the launch pad that allows this sliding motion so that SRB2 maintains its upright positioning aligned with SRB1.

By providing bevelled surfaces 3c and 5c on plates 3 and 5 respectively these two plates will tend to cam over any rough surfaces on the launch pad which might otherwise adversely affect free sliding of the system. Again, it is to be noted that these bevelled surfaces appear on both the inside and the outside edges of the two plates with the inside bevelled edges enhancing inward sliding. The purpose of providing the outside bevelled edges is that should the launch be shut down then the external tank is emptied and expands back to its original size causing an outward pushing on SRB2. In this case, it is the outside bevelled edges of the upper and lower plates that provide cammed surfaces for riding over any resistance on the launch pad to that outward sliding.

Figure 5:
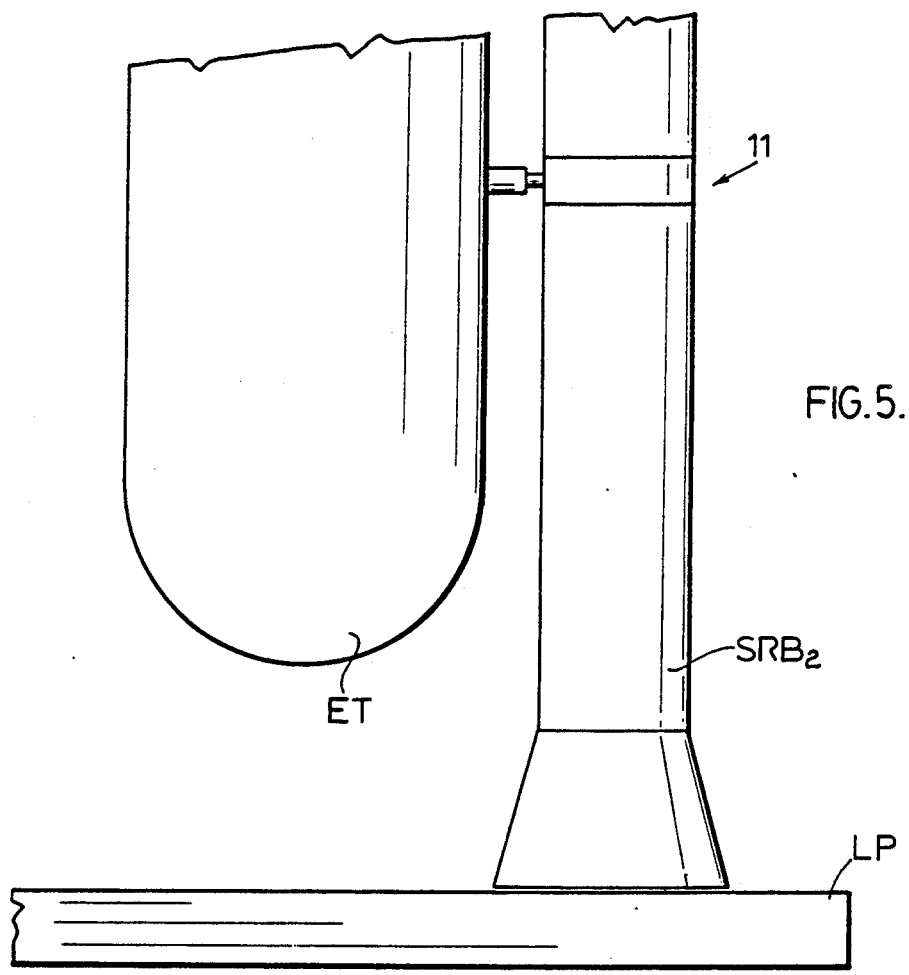
FIG. 5 is a front view of the lower connection region between an external tank and an outside solid rocket booster allowing relative movement between the booster and tank according to a further preferred embodiment of the present invention.
Figure 6:
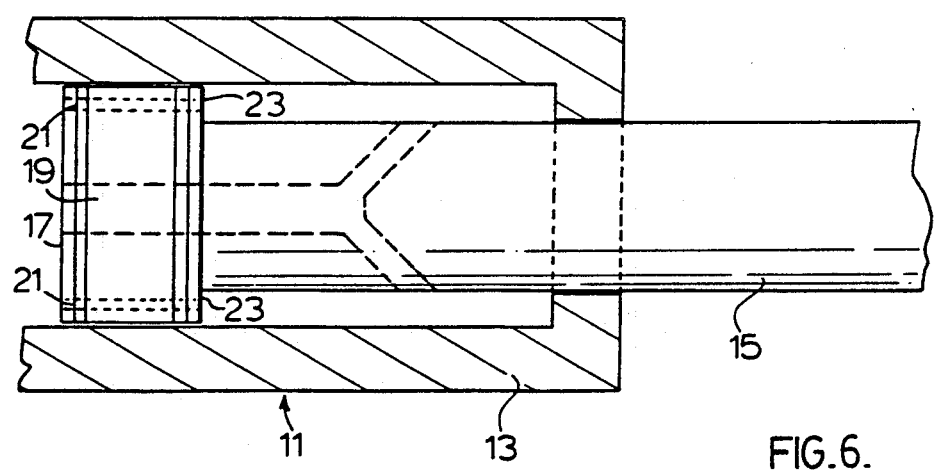
FIG. 6 is an enlarged sectional view of the strut used in FIG. 5.

The description above relates to an arrangement in which the outside SRB is allowed to move inwardly through its sliding base support with cryogenic shrinkage of the external tank. FIGS. 5 and 6 show a further aspect of the present invention in which there is provided a different type of slideable support for the SRB to compensate for cryogenic shrinkage. This support is in the form of a piston-type support strut, generally indicated at 11 in FIG. 5 and shown in more detail in FIG. 6.

Although FIG. 5 only shows the lower support strut, it is to be noted that there is also an upper support strut between the outside SRB and the external tank. However, the requirement for a slideable support for the outside SRB is greater at the lower strut because this is where the system experience greatest cryogenic shrinkage due to the increased volume and lower temperature of the hydrogen contained in the bottom of the tank relative to the oxygen carried in the top of the tank.

Referring in more detail to FIG. 6, strut 11 comprises a fluid housing 13 secured to the side of the external tank and a rod 15 secured to the SRB and able to reciprocate relative to housing 13.

Cryogenic shrinkage results in inward movement of the external tank relative to SRB2 which is allowed through elongation of support strut 11. However, for safety reasons this elongation must be under a resistance control which is provided using the internal set-up for the strut as shown in FIG. 6. More particularly, located within fluid chamber 13 is a plunger 21 having a main central Y-shaped through channel 19 and a pair of smaller side channels 21 each having a check valve 23 on the SRB side of the plunger.

When the shrinkage occurs, chamber 13 through its attachment to the external tank is pulled relative to rod 15 attached directly to the SRB. This results in a flow of motion controlling fluid within the chamber from the right to the left hand side of plunger 23. The only area for this flow to occur is through channel 19 with channels 21 being blocked by check valves 23. Therefore, there is only a limited flow area resulting in a slow travel of the plunger through chamber 13, i.e. a controlled expansion of the adjustable strut.

A unique feature of the piston strut as described immediately above is that it is also marked or gauged to show the amount of actual movement of the strut caused by the cryogenic shrinkage.

In the event that there is a cancellation of the space mission the external tank must be emptied with a resultant expansion of the tank. In this case, the length of the strut decreases so that there must be a fluid flow from the left to the right hand side of plunger 17. When moving in this direction, check valves 23 are allowed to opening providing flow paths at channels 21 as well as channel 19.

Figure 7:
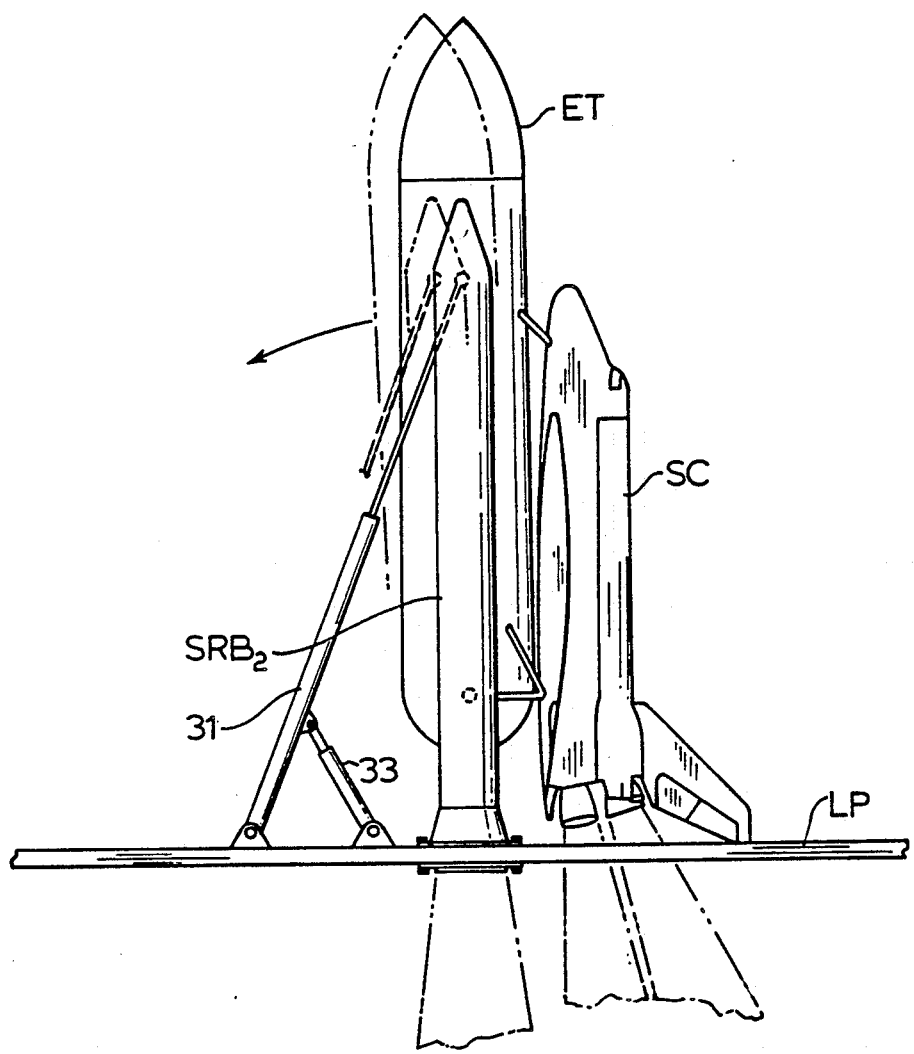
FIG. 7 is a side plan view of the arrangement shown in FIG. 1 incorporating an anti-twang feature according to still a further preferred embodiment of the present invention.

All of the description above is related to a control system for preventing misalignment of the outside relative to the inside SRB because of external tank cryogenic shrinkage. FIG. 7 shows a further embodiment of the present invention which is directed to a further stabilization of the overall set-up and acting as an anti-twang feature. Twang, which is well known to those skilled in the art, occurs during the prefiring of the shuttle craft liquid engines which are ignited at 100% capacity prior to firing of the SRB's. This causes a shift on the entire system as shown in dotted lines in FIG. 7. Note that this shift is perpendicular to the potential shifting of the outside SRB caused through tank shrinkage.

In order to resist this twang, a stabilizing bracing system, again formed by adjustable struts, is provided. More particularly, the bracing system comprises a pair of main upwardly, inwardly angled struts 31 (only one of which can be seen in the drawings) and secondary upwardly, outwardly angled struts 33 at the lower end of struts 31. All of these struts are pivotally mounted to the launch pad LP. The main struts are releasably attached at their upper ends to the upper horizontal struts between the SRB's and the external tank.

As the shuttle craft is fired during pre-launch, it will have a tendency to force the entire system to move to the left as shown. However, strut 31, which is hydraulic in operation, prevents any sharp or rapid movements of the system which would otherwise result in twanging. Adjustable shock strut 33 operates to provide a damping effect on strut 31 to eliminate any rapid pivoting of the latter strut about its mount at the launch pad. However, at the time of launch when strut 31 is automatically released at its upper end from its attachment to the SRB and the external tank, connecting strut 33 is used as a kick-out by extending and forcing strut 31 to move outwardly away from and clear the system for launching.

Strut 31, which as mentioned above and which is hydraulically operated, uses a silicon or silicon based fluid because of its resistance to compression further adding to the stability of the system.

Although various preferred embodiments of the invention have been described, it will be appreciated by those skilled in the art that variations may be made without departing from the spirit of the invention or the scope of the appended claims.

THE EMBODIMENTS OF THE INVENTION IN WHICH AN EXCLUSIVE PROPERTY OR PRIVILEGE IS CLAIMED ARE DEFINED AS FOLLOWS:

1. An improvement in a solid rocket booster and external tank launch pad mounting system for a space shuttle craft having an external tank with inside and outside solid rocket boosters to either side of the external tank and wherein the external tank experiences cryogenic shrinkage when filled with fuel, the improvement comprising slideable rocket booster support means for allowing such cryogenic shrinkage without affecting preset upright positioning of the outside solid rocket booster.

2. The improvement of claim 1, wherein said slideable rocket booster support means comprises at least one piston type support strut between the external tank and the outside solid rocket booster.

3. The improvement of claim 2, wherein said piston type support strut includes an internal plunger having a limited flow passage for controlled length adjustability of said support strut.

4. The improvement of claim 1, wherein said slideable rocket booster support means comprises a slideable base support for mounting the outside solid rocket booster to the launch pad.

5. The improvement of claim 4, wherein said slideable base support comprises upper and lower slideable plates above and below said launch pad, said upper and lower plates each being provided with inwardly and outwardly directed bevelled edges.

6. The improvement of claim 4, wherein the outside solid rocket booster is secured to the launch pad by a plurality of mounting members fitted through said slideable base support, the launch pad being provided with a main opening for receiving said outside solid rocket booster and a plurality of peripheral openings for receiving said mounting members, all of said openings being extended in a direction toward the external tank to enable inward sliding of said slideable base support during the cryogenic shrinkage.

7. The improvement of claim 6, wherein said slideable base support comprises first and second plates above and below said launch pad, each said plate being provided with openings for receiving and locating said outside solid rocket booster and said mounting members, the openings in said plates being positioned to align with the openings in said launch pad.

8. The improvement of claim 1, further including anti-twang stabilizing means.

9. The improvement of claim 8, wherein said anti-twang stabilizing means comprises a pair of main support struts pivotally secured to said launch pad and extending upwardly inwardly therefrom secured to the space shuttle craft, said main support struts being length adjustable for controlling shifting of the system comprising the solid rocket boosters, external tank and space shuttle craft.

10. The improvement of claim 9, including secondary small struts pivotally secured to said launch pad and angled upwardly outwardly to said main support struts, relative to said space shuttle craft, said secondary support struts being length adjustable for controlling inward and outward movement of said main support struts.

* * * * *